(12) United States Patent
Delorme et al.

(10) Patent No.: US 9,274,701 B2
(45) Date of Patent: Mar. 1, 2016

(54) METHOD AND SYSTEM FOR A CREASED PAPER EFFECT ON PAGE LIMITS

(71) Applicant: Nvidia Corporation, Santa Clara, CA (US)

(72) Inventors: Flavien Delorme, Vence (FR); Bruno De Smet, Valbonne (FR)

(73) Assignee: NVIDIA CORPORATION, Santa Clara, CA (US)

( * ) Notice: Subject to any disclaimer, the term of this patent is extended or adjusted under 35 U.S.C. 154(b) by 0 days.

(21) Appl. No.: 13/938,705

(22) Filed: Jul. 10, 2013

(65) Prior Publication Data

US 2015/0015494 A1   Jan. 15, 2015

(51) Int. Cl.
| | |
|---|---|
| *G09G 5/00* | (2006.01) |
| *G06F 3/0488* | (2013.01) |
| *G09G 5/37* | (2006.01) |
| *G06F 3/0485* | (2013.01) |
| *G06F 5/00* | (2006.01) |
| *G09G 5/34* | (2006.01) |

(52) U.S. Cl.
CPC ............ *G06F 3/0488* (2013.01); *G06F 3/0485* (2013.01); *G06F 5/00* (2013.01); *G09G 5/37* (2013.01); *G09G 5/34* (2013.01); *G09G 2340/045* (2013.01); *G09G 2340/14* (2013.01)

(58) Field of Classification Search
CPC ... G06F 3/0488; G06F 3/04883; G06F 3/044; G06F 3/0481; G06F 3/04812; G06F 3/0483; G06F 3/04845
USPC .......... 345/156–178; 715/730, 800, 830, 836, 715/863
See application file for complete search history.

(56) References Cited

U.S. PATENT DOCUMENTS

| | | | |
|---|---|---|---|
| 2008/0309632 A1* | 12/2008 | Westerman et al. .......... | 345/173 |
| 2010/0302172 A1* | 12/2010 | Wilairat ........................ | 345/173 |
| 2011/0107264 A1 | 5/2011 | Akella | |
| 2011/0161892 A1 | 6/2011 | Hamadene | |
| 2012/0266109 A1 | 10/2012 | Lim et al. | |
| 2013/0002707 A1 | 1/2013 | Jakab et al. | |
| 2013/0222312 A1 | 8/2013 | Wilson et al. | |
| 2013/0298068 A1* | 11/2013 | Lee et al. ...................... | 715/776 |
| 2014/0168095 A1* | 6/2014 | Mesguich Havilio ........ | 345/173 |

* cited by examiner

*Primary Examiner* — Jennifer Nguyen

(57) ABSTRACT

In a touchscreen viewing device, a method for implementing a crease effect. The method includes receiving a swipe input related to an image displayed on a touch screen of a viewing device, upon determination that the swipe input will generate an item end effect, causing a crease effect to appear on the image in response to the swipe input, and subsequent to the end of the swipe input, undoing the crease effect on the image to return the image to an original effect.

21 Claims, 7 Drawing Sheets

Zoom

Appearance during the swipe input

De-zoom

Appearance during the swipe input

METHOD AND SYSTEM FOR A CREASED PAPER EFFECT ON PAGE LIMITS

FIELD OF THE INVENTION

The present invention is generally related to touchscreen computer systems.

BACKGROUND OF THE INVENTION

A touchscreen is an electronic visual display that the user can control through simple or multi-touch gestures by touching the screen with one or more fingers. Some touchscreens can also detect objects such as a stylus or ordinary or specially coated gloves. The user can use the touchscreen to react to what is displayed and to control how it is displayed (for example by zooming the text size).

The touchscreen enables the user to interact directly with what is displayed, rather than using a mouse, touchpad, or any other intermediate device (other than a stylus, which is optional for most modern touchscreens). Touchscreens are common in devices such as game consoles, all-in-one computers, tablet computers, and smartphones. They can also be attached to computers or, as terminals, to networks. They also play a prominent role in the design of digital appliances such as personal digital assistants (PDAs), satellite navigation devices, mobile phones, and video games.

The popularity of smartphones, tablets, and many types of information appliances is driving the demand and acceptance of common touchscreens for portable and functional electronics. Touchscreens are popular in the medical field and in heavy industry, as well as in kiosks such as museum displays or room automation, where keyboard and mouse systems do not allow a suitably intuitive, rapid, or accurate interaction by the user with the display's content. Computer systems are increasingly being used to handle video streams and video information in addition to high performance 3D rendering.

SUMMARY OF THE INVENTION

In one embodiment, the present invention is implemented as a method for implementing a crease effect in a touchscreen viewing device. The method includes receiving a swipe input related to an image displayed on a touch screen of a viewing device, upon determination that the swipe input will generate an item end effect, causing a crease effect to appear on the image in response to the swipe input, and subsequent to the end of the swipe input, undoing the crease effect on the image to return the image to an original effect.

BRIEF DESCRIPTION OF THE DRAWINGS

The present invention is illustrated by way of example, and not by way of limitation, in the figures of the accompanying drawings and in which like reference numerals refer to similar elements.

DETAILED DESCRIPTION OF THE INVENTION

Figure 1:
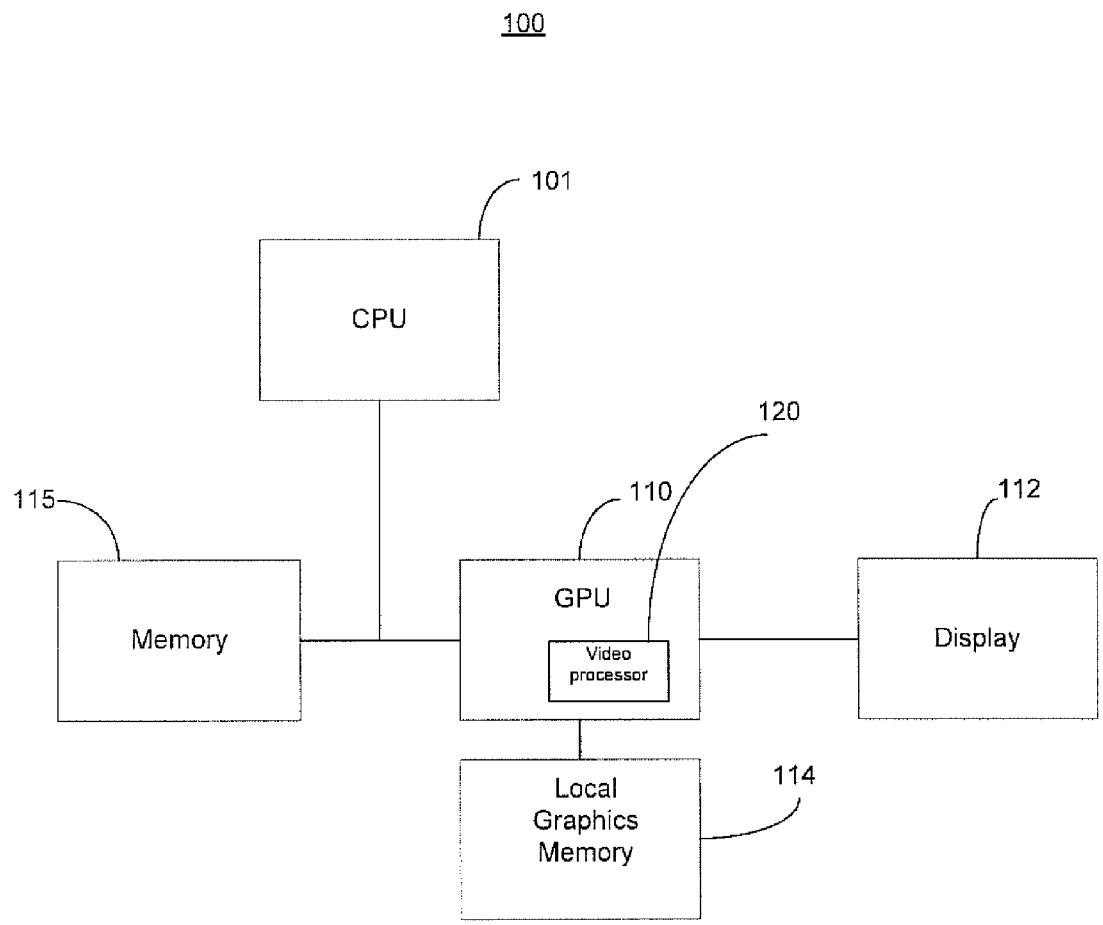
FIG. 1 shows a computer system in accordance with one embodiment of the present invention.

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail as not to unnecessarily obscure aspects of the embodiments of the present invention.

Notation and Nomenclature

Some portions of the detailed descriptions, which follow, are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "accessing" or "executing" or "storing" or "rendering" or the like, refer to the action and processes of a computer system (e.g., computer system 100 of FIG. 1), or similar electronic computing device, that manipulates and transforms data represented as physical (electronic) quantities within the computer system's registers and memories into other data similarly represented as physical quantities within the computer system memories or registers or other such information storage, transmission or display devices.

Computer System Platform

FIG. 1 shows a computer system 100 in accordance with one embodiment of the present invention. Computer system 100 depicts the components of a basic computer system in accordance with embodiments of the present invention providing the execution platform for certain hardware-based and software-based functionality. In general, computer system 100 comprises at least one CPU 101, a system memory 115, and at least one graphics processor unit (GPU) 110. The CPU 101 can be coupled to the system memory 115 via a bridge component/memory controller (not shown) or can be directly coupled to the system memory 115 via a memory controller (not shown) internal to the CPU 101. The GPU 110 is coupled to a display 112. One or more additional GPUs can optionally be coupled to system 100 to further increase its computational power. The GPU(s) 110 is coupled to the CPU 101 and the system memory 115. System 100 can be implemented as, for example, a desktop computer system or server computer system, having a powerful general-purpose CPU 101 coupled to a dedicated graphics rendering GPU 110. In such an embodiment, components can be included that add peripheral buses, specialized graphics memory, IO devices, and the like. Similarly, system 100 can be implemented as a handheld device (e.g., cellphone, etc.) or a set-top video game console device such as, for example, the Xbox®, available from Microsoft Corporation of Redmond, Wash., or the PlayStation3®, available from Sony Computer Entertainment Corporation of Tokyo, Japan.

It should be appreciated that the GPU 110 can be implemented as a discrete component, a discrete graphics card designed to couple to the computer system 100 via a connector (e.g., AGP slot, PCI-Express slot, etc.), a discrete integrated circuit die (e.g., mounted directly on a motherboard), or as an integrated GPU included within the integrated circuit die of a computer system chipset component (not shown). Additionally, a local graphics memory 114 can be included for the GPU 110 for high bandwidth graphics data storage.

Embodiments of the Invention

Figure 2:
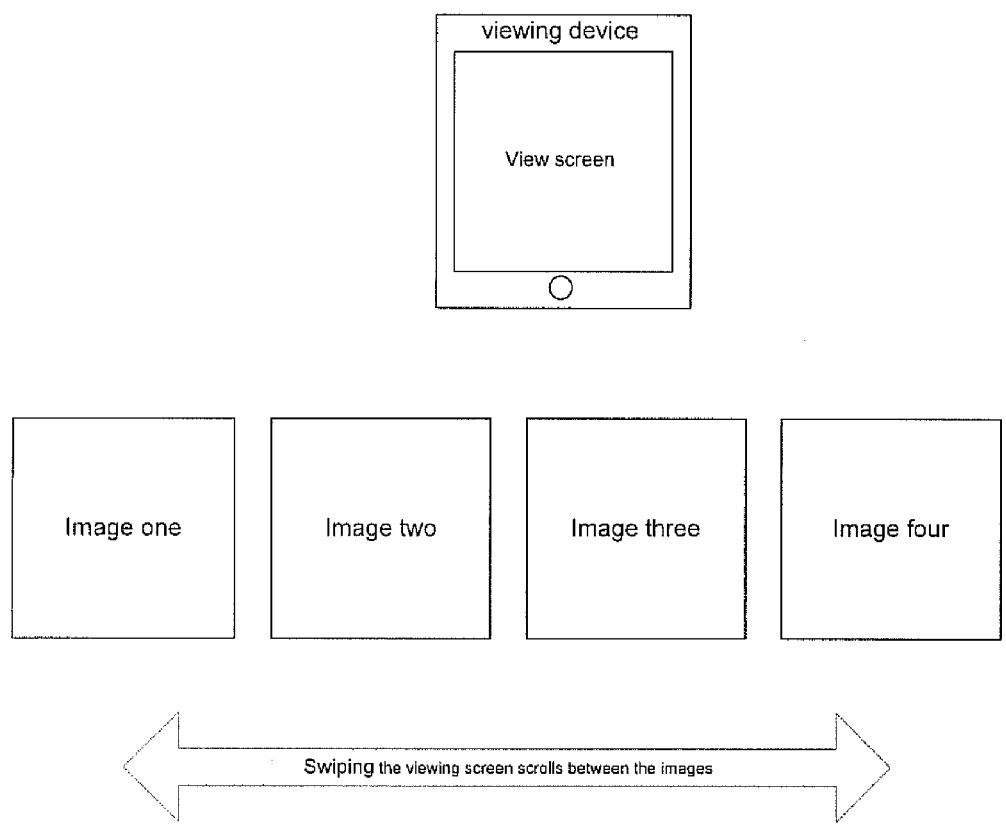
FIG. 2 shows a diagram of a viewing device having a viewing screen and a plurality of images in accordance with one embodiment of the present invention.

FIG. 2 shows a diagram of a viewing device having a viewing screen and a plurality of images in accordance with one embodiment of the present invention. The viewing device incorporates a computer system as illustrated in FIG. 1. The viewing device is intended to represent any of a number of different types of similar touchscreen devices (e.g., ipad, tablet personal computer, smart phone, or the like). The four images are shown as different images stored within the memory of the viewing device and that are accessed successively by swiping across the viewing screen to scroll to and visually display different ones of the four images on the viewing screen of the device.

Figure 3:
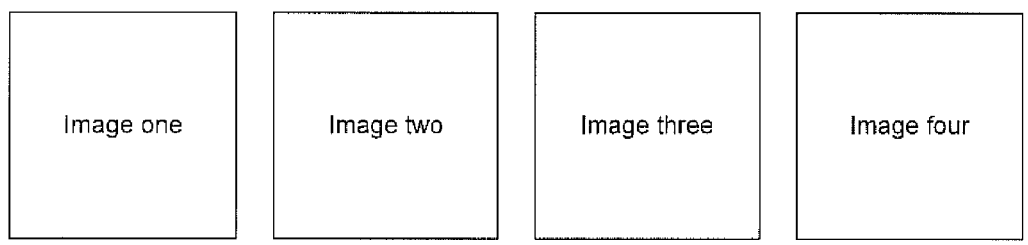
FIG. 3 shows scrolling to a last item in a group of items and further input causing an item end effect in accordance with one embodiment of the present invention.
Figure 3:

FIG. 3 shows scrolling to a last item in a group of items and further input causing an item end effect in accordance with one embodiment of the present invention. In one embodiment, when a user scrolls to a last item in a group of items, in this case image four, further attempts to scroll in that same direction will cause the device to implement what is referred to as an item end effect.

Figure 4:
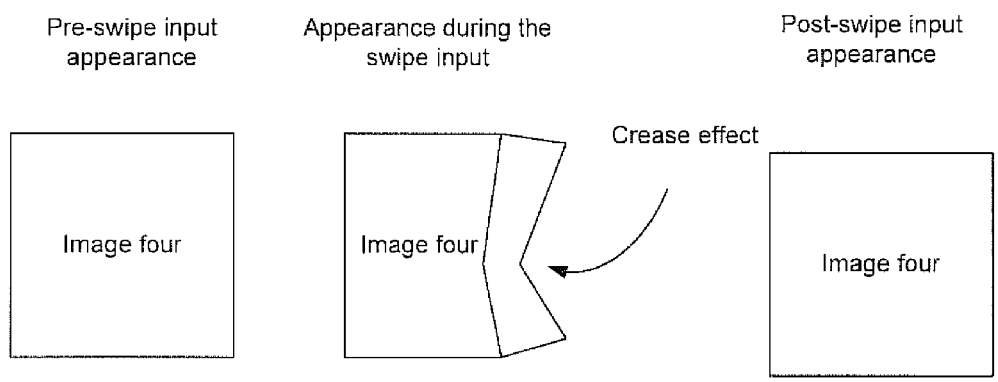
FIG. 4 shows the appearance of the image during the implementation of the end effect in accordance with one embodiment of the present invention.

FIG. 4 shows the appearance of the image during the implementation of the end effect in accordance with one embodiment of the present invention. In this embodiment, when a user scrolls to a last item in a group of items, in this case image four, further attempts to scroll in that same direction will cause the device to implement what is referred to as an item end effect, which in this case is referred to as a crease effect. For example, when a user attempts to scroll by swiping his finger across the "page", or surface of the viewing touchscreen, the effect of the swipe is visually depicted as the crease effect. This crease effect is similar to what happens to the page of a magazine when your finger causes an edge of the image to crease. In this manner, the user understands that the device successfully received his attempted input, or swipe, yet did not advance to the next image because this is the last image in the group.

Figure 5:
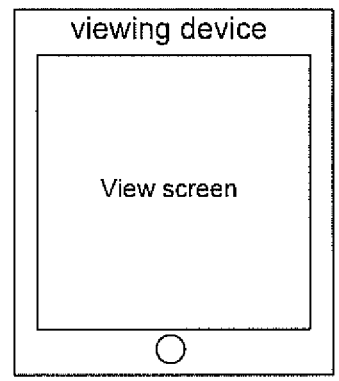
FIG. 5 shows a diagram illustrating a viewing device having a view screen being used to render a large image having dimensions larger than that of the view screen in accordance with one embodiment of the present invention.
Figure 5:
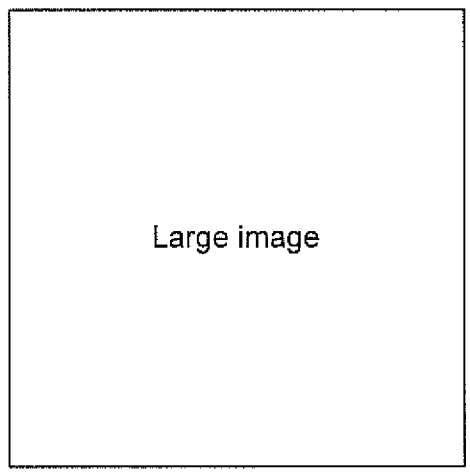

FIG. 5 shows a diagram illustrating a viewing device having a view screen being used to render a large image having dimensions larger than that of the view screen in accordance with one embodiment of the present invention. FIG. 5 depicts the situation where, when a user reads a page or watches a picture on a tablet or smartphone, if the content is bigger than the screen, the user has to make it scroll with his finger or pointer to visualize content outside the screen. When he reaches the end of the page a visual indication has to be provided otherwise the user may think that the device is unresponsive. The same problem occurs when a user is zooming or de-zooming a content and reaches the zoom limits.

Figure 6:
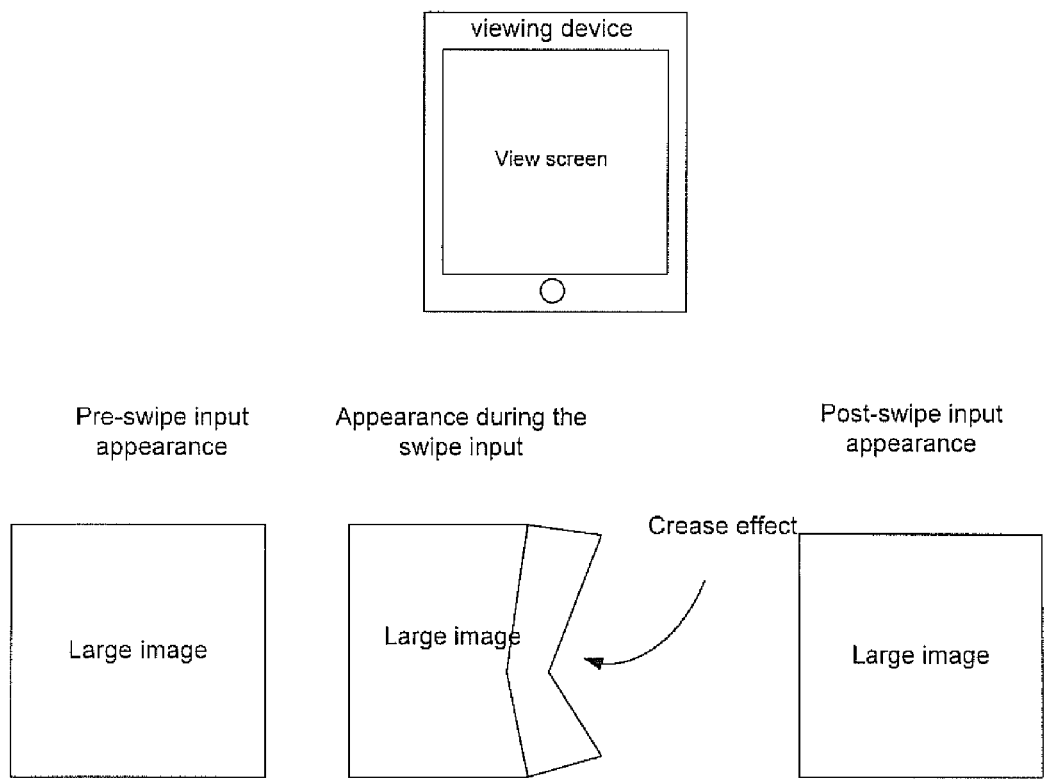
FIG. 6 shows a diagram illustrating a crease effect applied to a large image in accordance with one embodiment of the present invention.

FIG. 6 shows a diagram illustrating a crease effect applied to a large image in accordance with one embodiment of the present invention. This implementation functions by displaying a crease effect page distortion as if the user was pushing a real paper against an obstacle. The distortion could look elastic as if the page was made of rubber or could look like a creased paper.

In one embodiment, respectively when zooming or de-zooming beyond limits, the same kind of crease effect distortion could make the paper look pinched or stretched. In one embodiment, the distortion could follow the movements of the user's finger or pointer to make it more realistic. As soon as the user would release the tension, the page would go back to normal. This is shown by the pre-swipe input appearance, the appearance during the swipe input, and the post swipe input appearance.

This solution would be an alternative to existing end of page animations and if done properly would show the power and usefulness of the graphical unit of the viewing device. Embodiments of the present invention could go in any phone or tablet embedding readers, web browsers, anything displaying scrolling pages. Additional embodiments could include laptops or any other device that includes a touch screen. In one embodiment, it could be some kind of visual identification for any Tegra based device showing what GPU unit is capable of doing in real time.

Figure 7:
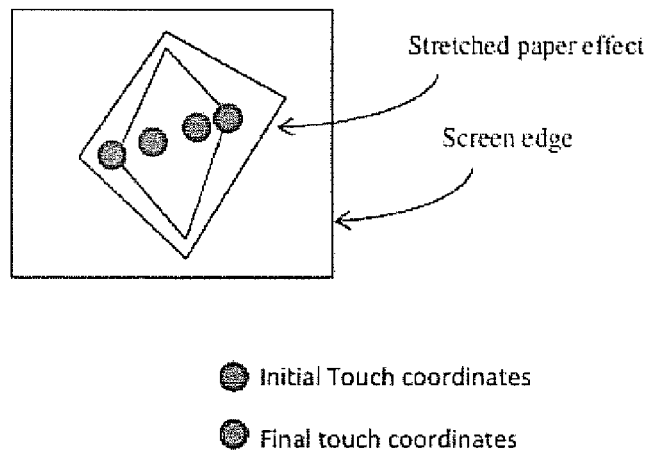
FIG. 7 shows a second diagram illustrating a crease effect applied to a large image in accordance with one embodiment of the present invention.
Figure 7:
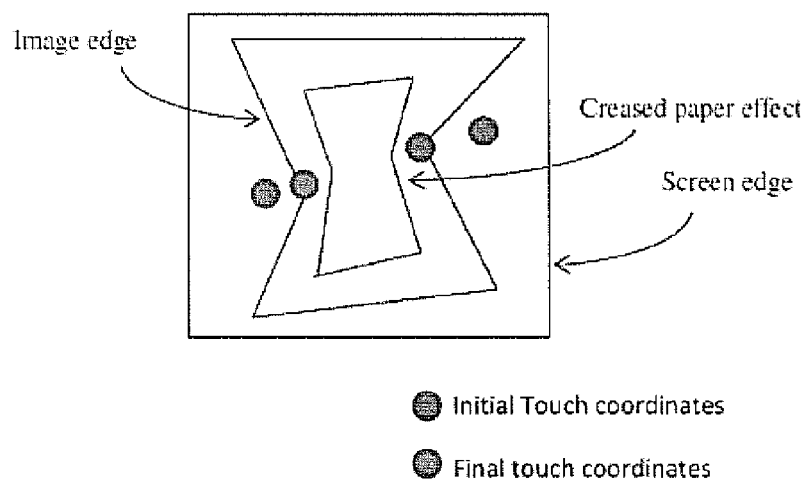

FIG. 7 shows a second diagram illustrating a crease effect applied to a large image in accordance with one embodiment of the present invention. In this FIG. 7 embodiment, when zooming or de-zooming beyond limits, the crease effect distortion could make the paper look pinched or stretched, particularly with respect to the pinching of a multi-touch swipe input from the user. For example, the upper image in FIG. 7 shows the initial touch accordance from two fingers of a user and the final touch accordance of the two fingers of the user. This shows how the user is attempting to zoom in by pinching outwards on the image (e.g., placing two fingers close together on the touchscreen image and swiping the two fingers further apart). This causes the stretched a perfect depicted.

Similarly, the lower image of FIG. 7 shows how the user is attempting to pinch inwards in order to zoom in, and the resulting creased paper effect from the attempt to zoom in beyond the image limits. As described above, the distortion could follow the movements of the user's finger or pointer to make the effect realistic. As soon as the user would release the tension, the page would go back to normal. The power of the devices GPU can make the stretch paper effect smooth and completely natural in appearance, as if the user is pinching and stretching an image on a piece of paper.

In one embodiment, the pinching movement associated with the creased paper effect can be implemented as actions that cause the closure of applications executing on the device. Another example would be window closure of an application. Another example would be switching between applications. Each of the above mentioned implementations can be made more fluid and graphically smooth by using the power of the GPU of the device.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. In a touchscreen viewing device, a method for implementing a crease effect, comprising:
   receiving a swipe input related to an image displayed on a touch screen of a viewing device; and
   upon determination that the swipe input will generate an item end effect, causing a crease effect to appear on the image in response to the swipe input, wherein the swipe input comprises an access request beyond an end of data of a file associated with the image; and
   subsequent to the end of the swipe input, undoing the crease effect on the image to return the image to an original effect.

2. The method of claim 1, wherein the image is one of a group of images and the end effect is in response to scrolling to the last one of the group of images.

3. The method of claim 1, wherein the image is an image having larger dimensions than that of the touchscreen, and wherein the end effect is in response to zooming past limits of the touchscreen.

4. The method of claim 1, wherein the image is an image having larger dimensions than that of the touchscreen, and wherein the end effect is in response to de-zooming past limits of the touchscreen.

5. The method of claim 1, wherein the image is an image having larger dimensions than that of the touchscreen, and wherein the end effect is in response to scrolling past limits of the touchscreen.

6. The method of claim 1, wherein the touchscreen viewing device is a tablet PC.

7. The method of claim 1, wherein the touchscreen viewing device is a smart phone.

8. The method of claim 1, wherein the crease effect is implemented by a GPU of the touchscreen viewing device.

9. A non-transitory computer readable memory having computer readable code which when executed by a computer system causes the computer system to implement a method for a crease effect on a touchscreen viewing device, comprising:
   receiving a swipe input related to an image displayed on a touch screen of a viewing device; and
   upon determination that the swipe input will generate an item end effect, causing a crease effect to appear on the image in response to the swipe input, wherein the swipe input comprises an access request beyond an end of data of a file associated with the image; and
   subsequent to the end of the swipe input, undoing the crease effect on the image to return the image to an original effect.

10. The computer readable memory of claim 9, wherein the image is one of a group of images and the end effect is in response to scrolling to the last one of the group of images.

11. The computer readable memory of claim 9, wherein the image is an image having larger dimensions than that of the touchscreen, and wherein the end effect is in response to zooming past limits of the touchscreen.

12. The computer readable memory of claim 9, wherein the image is an image having larger dimensions than that of the touchscreen, and wherein the end effect is in response to de-zooming past limits of the touchscreen.

13. The computer readable memory of claim 9, wherein the image is an image having larger dimensions than that of the touchscreen, and wherein the end effect is in response to scrolling past limits of the touchscreen.

14. The computer readable memory of claim 9, wherein the touchscreen viewing device is a tablet PC.

15. The computer readable memory of claim 9, wherein the touchscreen viewing device is a smart phone.

16. The computer readable memory of claim 9, wherein the crease effect is implemented by a GPU of the touchscreen viewing device.

17. A touchscreen viewing device, comprising:
   a system memory;
   a central processor unit coupled to the system memory; and
   a graphics processor unit communicatively coupled to the central processor unit; and a touchscreen, wherein the central processor unit executes computer readable code and causes the touchscreen viewing device to implement a method for using a crease effect, comprising:
   receiving a swipe input related to an image displayed on a touch screen of a viewing device; and
   upon determination that the swipe input will generate an item end effect, causing a crease effect to appear on the image in response to the swipe input, wherein the swipe input comprises an access request beyond an end of data of a file associated with the image; and
   subsequent to the end of the swipe input, undoing the crease effect on the image to return the image to an original effect.

18. The touchscreen viewing device of claim 17, wherein the image is one of a group of images and the end effect is in response to scrolling to the last one of the group of images.

19. The touchscreen viewing device of claim 17, wherein the image is an image having larger dimensions than that of the touchscreen, and wherein the end effect is in response to zooming past limits of the touchscreen.

20. The touchscreen viewing device of claim 17, wherein the image is an image having larger dimensions than that of the touchscreen, and wherein the end effect is in response to de-zooming past limits of the touchscreen.

21. The touchscreen viewing device of claim 17, wherein the access request is beyond an edge of the image.

* * * * *